United States Patent [19]
Ford

[11] Patent Number: 4,892,427
[45] Date of Patent: Jan. 9, 1990

[54] SEAL FOR A DOSAGE DISPENSER TUBE

[75] Inventor: John Ford, Cordova, Tenn.

[73] Assignee: Plough, Inc., Memphis, Tenn.

[21] Appl. No.: 210,896

[22] Filed: Jun. 24, 1988

Related U.S. Application Data

[63] Continuation-in-part of Ser. No. 75,385, Jul. 20, 1987, abandoned.

[51] Int. Cl.$^4$ .................. A46B 11/02; A45D 40/26
[52] U.S. Cl. .................. 401/182; 401/171; 401/176; 401/279; 222/391; 92/245; 92/DIG. 4
[58] Field of Search ............... 401/143, 149, 150, 171, 401/175, 176, 180, 182, 278, 179, 279; 222/391, 359, 402.11, 505, 509, 510; 277/103, 205, 206 R, 206 A; 92/29, 30, 240, 242, 243, 245, 251, 229, DIG. 4

[56] References Cited

U.S. PATENT DOCUMENTS

| | | | |
|---|---|---|---|
| 1,668,511 | 5/1928 | McLaughlin | 222/391 X |
| 2,214,261 | 9/1940 | Roth | 277/205 X |
| 2,243,774 | 5/1941 | Resh | 401/171 X |
| 2,488,638 | 11/1949 | O'Connor | 222/391 X |
| 2,541,949 | 2/1951 | Thacker et al. | 222/391 X |
| 2,587,794 | 3/1952 | Walker et al. | 401/176 X |
| 2,642,607 | 6/1953 | Bozzalla | 401/150 |
| 2,870,843 | 1/1959 | Rodgers, Jr. | 277/205 X |
| 3,215,320 | 11/1965 | Heisler et al. | 222/391 |
| 3,255,935 | 6/1966 | Spatz | 222/391 X |
| 4,061,346 | 12/1977 | Coleman et al. | 277/205 |

Primary Examiner—Richard J. Apley
Assistant Examiner—David J. Bender
Attorney, Agent, or Firm—Thomas D. Hoffman; Gerald S. Rosen; Warrick E. Lee

[57] ABSTRACT

A dispenser for dispensing metered amounts of a viscous material includes a rigid tube which defines a compartment for the material, a discharge passage at one end of the tube, a push button activated and reciprocatingly movable rod which moves back and forth between two positions in the tube, and a sealing plunger which moves step-wise on the rod, from the push button end to the discharge end. Each activation of the push button expels a metered amount of the viscous material. The plunger is formed of a short inner tube section which makes sealing contact with the rod, an outer tube section which is in sealing contact with the interior surface of the tube and a radially extending, ring-shaped, rib which connects the two sealing tubes to one another. In a preferred embodiment, the radial cross-section of the plunger exhibits and H-shape. A metallic gripper is secured to the plunger and has a free end which is inclined toward the rod. When the rod is pushed forwardly the gripper bites into the rod causing the plunger to be carried forwardly with the rod to discharge a metered quantity of the viscous material. However, on the backward stroke of the rod, the inter-engagement with the gripper is lost permitting the plunger to remain in place.

38 Claims, 6 Drawing Sheets

SEAL FOR A DOSAGE DISPENSER TUBE

BACKGROUND OF THE INVENTION

This is a Continuation-in-part of U.S. Patent Application Ser. No. 075,385, filed July 20, 1987 now abandoned.

The present invention is generally related to a container/dispenser for dispensing metered amounts of viscous material and more particularly materials such as nail polish, lipstick, foundation make-up or the like.

Various devices are known for dispensing metered quantities of a viscous material. Generally speaking, these devices include a rigid tube which defines a compartment for containing the product to be dispensed, a discharge opening at one end of the tube and a push button at the opposite end. An elongate rod, coupled to the push button, extends along the axis of the tube and is reciprocatingly movable back and forth within the tube, in response to actuation of the push button. The rod contains a plurality of longitudinally spaced and transversely extending ridges of the type which are found in devices which provide ratcheting action to turn or move an element thereof.

The viscous material is expelled from the tube by a plunger, having the general shape of a ring or a disc, which plunger surrounds the rod and extends from the rod to the interior surface of the tube. Initially, the plunger is located toward the push button end of the rod and the viscous material fills the tube between the plunger and the discharge opening. The plunger is equipped with a catch or flap which engages the ridges on the rod with the effect that forward movement of the rod snags the catch and pushes the plunger forward, along with the rod. However, the return stroke of the rod leaves the plunger in place as the catch slides over the ridges of the backwardly moving rod. Thus, each actuation of the push button advances the plunger and results in the expulsion of a metered amount of the viscous material from the tube.

Numerous patents have issued on devices of the foregoing type including the following.

U.S. Pat. No. 677,667 depicts a ridged rod "d", a push button "h" (see FIG. 3), a plunger "f" and a hingedly mounted ratchet like device "v" which operates according to the principles set forth above.

U.S. Pat. No. 851,586, to Clark, is another such device having a rod with a plurality of teeth or barbs 8 which enable a piston or a plunger 5 to move toward the discharge opening and thereby expel material from a paste tube.

Another arrangement of the type referred to herein is shown in U.S. Pat. No. 949,545 to Muller.

A somewhat similar arrangement for a toothpaste cylinder/toothbrush is described in U.S. Pat. No. 1,212,010 to Brown.

Other devices having the general characteristics of the present invention are described in U.S. Pat. Nos. 1,668,511; 2,056,173; 3,255,935; 4,522,317; 4,506,810; 1,370,665; 2,488,638; 2,521,882; 3,215,320; 3,348,740; and 4,331,267.

A potential problem with prior art embodiments concerns the possibly imperfect seal that might be attained between the ridged rod and the plunger which moves therealong. The viscous material might tend to leak past the plunger, particularly during activation of the push button when the plunger exerts an increased pressure on the viscous material.

The prior art sealing technique is typified, for example, by the above mentioned U.S. Pat. No. 677,667 to Kirschen which depicts, in FIG. 3 thereof, a plunger "f" that has an axial dimension/extension which is far smaller than the radial dimension of the plunger. Consequently, the surface contact area between the rod and the plunger is small. For highly viscous materials such as nail polish and the like the possibility that the material to be dispensed will leak past the plunger is high.

The susceptibility to leakage at the rod is also present in the embodiment depicted in U.S. Pat. Nos. 851,586 and 949,545, particularly since the axial extension of the plunger adjacent the rod is relatively short. Moreover, the surface of the plunger which contacts the rod is not resiliently biased thereagainst to resist the somewhat pressurized viscous material from penetrating between the plunger and the rod.

While in the arrangement depicted in U.S. Pat. No. 4,506,810, the axial extension of the seal 26 along the rod is relatively longer, no means are provided, however, for exerting a radial, inwardly directed, force on the plunger to assure better and more leak proof sealing against the rod. Similar remarks are applicable with respect to the writing instrument which is illustrated in U.S. Pat. No. 2,488,638 to O'Connor.

Moreover, several of the prior art devices, see for example U.S. Pat. No. 4,506,810 to Goncalves, incorporate the disadvantage that the flap or catch for advancing the longer along the rod is located such that it is exposed to the viscous material in the tube. The plunger advancing means is thus susceptible to interference from or damage by the viscous material.

SUMMARY OF THE INVENTION

The present invention provides an improved plunger for a dosage dispenser tube, specifically a plunger having improved sealing qualities, a symmetrical construction and greater operational reliability. The novel plunger can be manufactured as an integral component and preferably as a single molded piece, easily and inexpensively.

The invention may be summarized as a dispenser for dispensing metered portions of a viscous material, said dispenser comprising;

a cylindrical tube having an actuating axial end and a discharge end through which the viscous material may be expelled from said tube and an interior surface facing into said tube;

a rod disposed in said cylindrical tube having a plurality of transversely extending ridges spaced along a longitudinal direction of said rod;

push button means operatively coupled to said rod for reciprocating said rod axially within said tube from a first position to a second position closer to said discharge end than said first position;

biasing means for urging said push button means and rod toward said first position;

a plunger extending around said rod and movable therealong from said actuating end of said tube toward said discharge end, said plunger extending radially from said rod to said interior surface of said tube and being effective to provide a first seal between said interior surface and said plunger and a second seal between said rod and said plunger, said plunger having a general H-shaped cross-section, for cross-sections taken along radial-longitudinal planes in said tube through said plunger, said plunger comprising an outer tubular section which sealingly contacts and is movable along said interior surface of the tube, forming said first seal, an inner tubular section which sealingly surrounds said rod and forms said second seal and a ring-shaped rib extending radially in said tube and connecting said outer and inner tubular sections to one another; and catch means connected to said plunger and engageable with said ridges on said rod for moving said plunger, in ratchet-like manner, on said ridges of said rod in a direction toward said discharge end.

Preferably said outer and inner tubular sections have respective longitudinal centers, said rib is connected to said outer and inner tubular sections at the longitudinal centers thereof, and said plunger and said catch means are comprised of a single integral piece. This constitutes a highly desirable lipstick dispenser.

It is also preferable for the dispenser to further comprise a gripper means, secured to said plunger and engageable with said interior surface, for preventing said plunger from moving in a direction toward said actuating axial end.

To provide an excellent nail polish application, a brush may be disposed adjacent said discharge end for receiving the viscous material and for facilitating application of the material to a receiving surface.

A second embodiment of the invention comprises a dispenser for dispensing metered portions of a viscous material, said dispenser comprising:

a cylindrical tube having an actuating axial end and a discharge end through which the viscous material may be expelled from said tube and an interior surface facing into said tube;

a smooth faced rod disposed in said cylindrical tube;

push button means operatively coupled to said rod for reciporcating said rod axially within said tube from a first position to a second position closer to said discharge end than said first position;

biasing means for urging said push button means and rod toward said first position;

a plunger extending around said rod and movable therealong from said actuating end of said tube toward said discharge end, said plunger extending radially from said rod to said interior surface of said tube and being effective to provide a first seal between said interior surface and said plunger and a second seal between said rod and said plunger; and a gripper secured to said plunger and having a first gripper arm for engaging and biting into said rod when said rod is moved toward said discharge end to thereby carry said plunger forwardly with said rod and a second gripper arm for biting into said cylindrical tube when said rod is being retracted to its second position to prevent said plunger and gripper from moving with said rod toward said actuating end. This dispenser constitutes a highly desirable nail polish dispenser.

In a preferred embodiment this plunger has a general H-shaped cross-section, for cross-sections taken along radial longitudinal planes in said tube through said plunger. More preferably this plunger comprises an outer tubular section which sealingly contacts and is movable along said interior surface of the tube, an inner tubular section which sealingly surrounds said rod and a ring-shaped rib extending radially in said tube and connecting said outer and inner tubular sections to one another.

For all embodiments of this invention it is convenient if the push button means includes delay means for delaying forward movement is said rod with respect to forward actuation of said push button means.

A third embodiment of the invention comprises a dispenser for dispensing metered portions of a viscous material, said dispenser comprising:

a cylindrical tube having an actuating axial end and a discharge end through which the viscous material may be expelled from said tube and an interior surface facing into said tube;

a smooth-faced rod disposed in said cylindrical tube;

push button means operatively coupled to said rod for reciprocating said rod axially within said tube from a first position to a second position closer to said discharge end than said first position, said push button means including delay means for delaying forward movement of said rod with respect to forward actuation of said push button means;

biasing means for urging said push button means and rod toward said first position;

a plunger extending around said rod and moveable therealong from said actuating end of said tube toward said discharge end, said plunger extending radially from said rod to said interior surface of said tube and being effective to provide first seal between said interior surface and said plunger and a second seal between said rod and said plunger; and gripper means for engaging said plunger with said rod when said rod is moved toward said discharge end in a manner that is effective to carry said plunger toward said discharge end. The gripper means preferably includes a first gripper arm for engaging and biting into said rod when said rod is moved toward said discharge end to thereby carry said plunger forwardly and a second gripper arm for biting into said interior surface of said cylindrical tube when said rod is being retracted to a resting position to prevent said plunger and gripper from moving toward said actuating end. As with other embodiments it is preferable for said plunger to comprise an outer tubular section which sealingly contacts and is movable along said interior surface of said tube, an inner tubular section which sealingly surrounds said rod and a ring-shaped rib extending radially in said tube and connecting said outer and inner tubular sections to one another.

BRIEF DESCRIPTION OF THE DRAWINGS

FIG. 6d is a cross-section through a plunger similar to that of FIG. 6a, but modified to include a second catch which is diametrically juxtaposed to the first catch depicted in FIG. 6a.

DETAILED DESCRIPTION OF THE PREFERRED EMBODIMENTS

Figure 1:
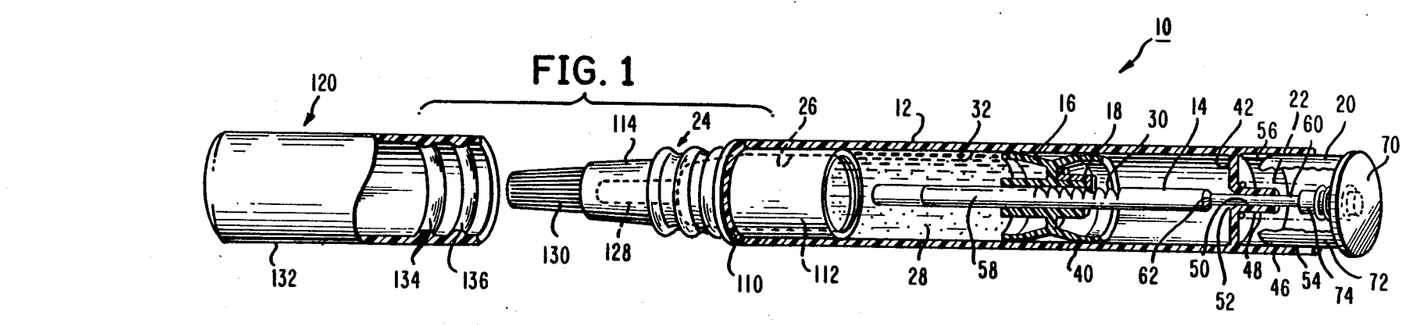
FIG. 1 is a perspective of the dispenser of the present invention.
Figure 2:
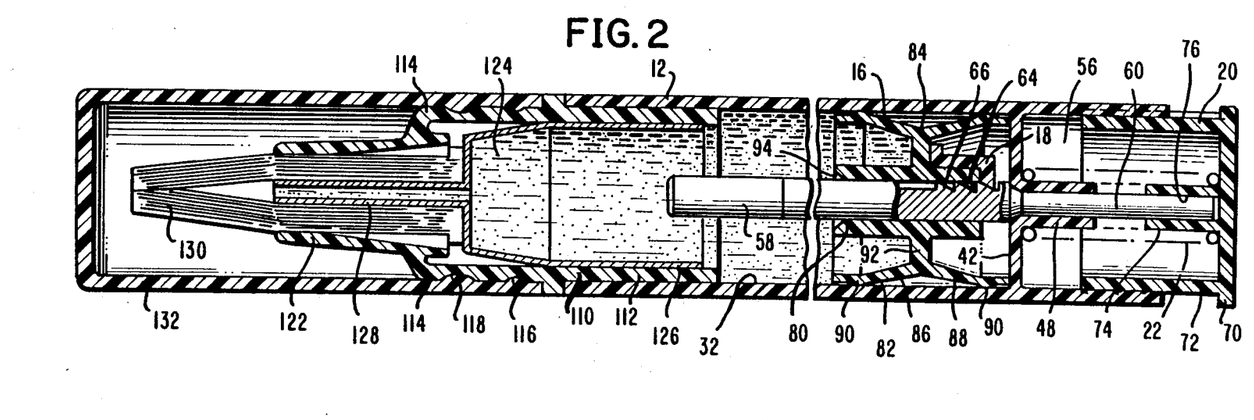
FIG. 2 is a longitudinal cross-section through the dispenser of FIG. 1.

Referring to FIGS. 1-5, dispenser 10 of the present invention includes a cylindrical tube 12, a ridged rod 14, a plunger 16 having a catch 18, a push button 20 coupled to rod 14 and outwardly biased by spring 22, and a discharge mechanism 24 attached to the tube at a discharge opening 26 thereof The plunger 16 surrounds rod 14 and is slidable relative thereto It is initially disposed near and toward push button 20. Tube 12 is filled with a viscous material 28 between the plunger 16 and the discharge mechanism 24 with the intention that the viscous material 28 will be discharged in metered portions from tube 12. Depression of push button 20 moves rod 14 a set distance toward the discharge mechanism 24 whereby the plunger 16, whose catch 18 is engaged by the slanted ridges 30 of rod 14, is carried forwardly with rod 14. As a result, a metered amount of the material 28 is forcefully expelled out of tube 12. Upon being released, push button 20 and rod 14 are urged by spring 22 back to a rest position, as shown in FIG. 2.

On account of the ratchet-type engagement of catch 18 of plunger 16 with the ridges 30 of rod 14 and the frictional force between the plunger 16 and the interior surface 32 of tube 12, plunger 16 retains its position relative to tube 12 as rod 14 moves back toward its rest position. Subsequent actuation of push button 20 advances plunger 16 further toward the discharge opening until, eventually, substantially all the material 28 is expelled from tube 12.

More specifically, tube 12 of the present invention is formed of a relatively rigid material such as a metal, glass, ceramic or hard plastic and includes a cylindrical peripheral wall 40 which is open at the discharge end 26 and closed by a bottom wall 42 near an actuating end 46. Bottom wall 42 has a neck 48 and an opening 50 passing through the bottom wall 42 and the neck 48. The entranceway 52 into opening 50 is chamfered to ease insertion of the provide a good fit for the rod 14 in the opening 50. At the bottom wall 42 and extending from peripheral wall 40 is a skirt wall 54 which defines a well 56 for the push button 20.

Rod 14 is formed of a main section 58 and a rod extension 60. The main section 58 extends along the axis of tube 12 from the bottom wall 42 towards and near to the discharge opening 26. At the junction 62, between the main section 58 and rod extension 60, rod 14 changes from a relatively wide-diameter cross-section at section 58 to the reduced diameter of extension 60.

Extension 60 fits snugly in the opening 50 and projects from neck 48 into well 56 of tube 12. The junction 62 of rod 14 is tapered at an angle which allows the junction region to fit snugly in the chamfered entranceway 52 of opening 50.

Main section 58 of rod 14 is formed with a plurality of laterally extending and longitudinally spaced ridges or barbs 30. As better seen in FIG. 2, each of the ridges 30 has a radially extending surface 64 and an inclined, second surface 66. The ridges 30 extend either along the entire circumferential periphery of rod 14 or they may be formed over a predetermined arc angle of the rod 14.

The rod 14 itself may be formed of any rigid material such as a metal, plastic or the like. Although a cylindrical rod is preferred, the rod 14 could have a square or rectangular cross-section or a composite cross-section of a mainly cylindrical cross-section, except for one or two flat faces on which the ridges 30 may be formed.

Push button 20 has a top 70 and a depending and annularly extending skirt 72. The diameter of skirt 72 is sized to just fit into well 56 of tube 12. Projecting from top 70 into well 56 is a push button neck 74 which defines a rod stem receiving recess 76. In assembled form, the free end of rod extension 60 is received and secured by adhering means in the recess 76 so that the push button 20 and rod 14 become a single movable unit. The adhering means could constitute adhesives, sonic welding, mechanical coupling or practically any known fastening means. The spring 22 is disposed in well 56 and is fitted around necks 48 and 74 of tube 12 and push button 20, respectively. Spring 22 biases push button 20 away from tube 12 to the point when the action of the spring 22 is restrained by the engagement of tapered junction 62 in the chamfered entranceway 52 of tube 12.

In the depressed position, the distal end of skirt 72 or neck 74 of push button 20 abut, respectively, the bottom wall 42 or the neck 48 of tube 12. Consequently, depressing and releasing push button 20 causes rod 14 to reciprocate within the tube 12 between two positions. Note, however, that push button 20 may be depressed, if desired, only partially, in order to obtain smaller ranges of travel for rod 14 within tube 12. The user may in this manner choose to dispense a smaller amount of the viscous material 28.

As better seen in FIG. 2, the plunger 16 has a general H-shape cross-section, when viewed along a radial-axial plane which extends from the rod 14 to the wall 40 of the tube 12.

The H-shaped plunger 16 has a short inner tube section 80 which fits tightly against and is slidable relative to rod 14. A second, larger diameter, outer tube section 82 coaxially surrounds inner tube 80 and is resiliently biased against the interior surface 32 of tube 12 to provide a good seal between the plunger 16 and the interior surface 32. Outer tube 82 is constituted of a center region 84, which is offset from interior surface 32, and inclined wall sections 86 and 88 which extend obliquely from the center region toward interior surface 32. Toward their distal ends, each wall section 86, 88 contains a respective circumferentially extending projection 90 which provides the actual seal between the plunger 16 and the interior surface 32.

Connecting outer tube 82 to inner tube 80 is a ring-shaped disc or rib 92 which extends generally radially in the tue 12 from the center region 84 of the outer tube 82 to the center of inner tube 80.

Rib 92 is relatively thin and preferably has a generally uniform thickness. Its thickness is substantially smaller than the extension of tubes 80 and 82 to either side thereof. For example, and as depicted in the drawings, the thickness of rib 92 is about one tenth of the axial length of inner tube 80 and even a smaller fraction of the length of outer tube 82. The thinness of rib 92 relative to the axial dimensions of plunger tubes 80 and 82 is effective for resiliently transmitting and equalizing the forces acting on the tubes 80 and 82.

The inclined wall sections 86 and 88 of outer tube 82 bear resiliently against interior surface 32 and provide a leak proof seal thereagainst. Moreover, the reactive force exerted by the interior surface 32 on outer tube 82 is transmitted, via rib 92, to inner tube 80 with the effect that inner tube 80 is squeezed from all sides against rod 14 to provide better sealing characteristics between the rod 14 and the plunger 16. Thus, as the plunger 16 moves from the actuating end toward the discharge end the viscous material 28 will not leak past the plunger 16 either at the rod 14 or at the interior surface 32 of the tube 12. Moreover, since the inner tube 80 extends over a relatively substantial axial distance of rod 14 still further improved sealing properties are obtained.

Note also the slightly enlarged opening 94 into the interior of inner tube 80 which aids in insertion of rod 14 into plunger 16 during assembly of dispenser 10.

Figure 6A:
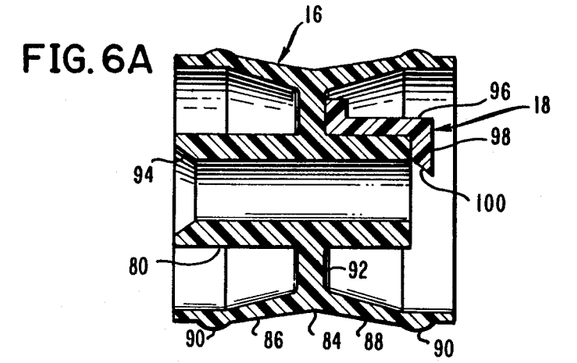
FIG. 6a is a cross-section of the plunger illustrated in FIG. 1.

Referring to FIG. 6a, the catch 18 of plunger 16 includes a longitudinally extending section 96 which is attached at a trailing end of inner tube 80 and an inwardly directed and radially extending resilient flap portion 98 which is bevelled at 100 as shown. The catch 18 may extend over a predetermined arc angle around inner tube 80 or circumferentially around the entirety of inner tube 80. Catch 18 is connected to plunger 16 by an adhesive, screw, or the like, or it may be formed integrally therewith. Preferably, the catch 18 and the plunger 16 are formed of plastic, as a single integrally molded piece.

In operation, as push button 20 is depressed inwardly, rod 14 is urged forwardly and the radially extending surface 64 of its ridges 30 engage flap portion 98 to thereby cause plunger 16 to move with rod 14. A metered amount of viscous material 28 is thus expelled from tube 12. Upon release of push button 20, the rod 14 moves back to its rest position due to the action of spring 22. The plunger 16 is, however, restratined by the frictional force exerted thereon from interior surface 32 which causes the plunger 16 to remain stationary relative to tube 12. As rod 14 moves backwardly in the tube 12 the bevelled surface 100 of the flap section 98 rides over the inclined surfaces 66 of ridges 30.

Figure 3:
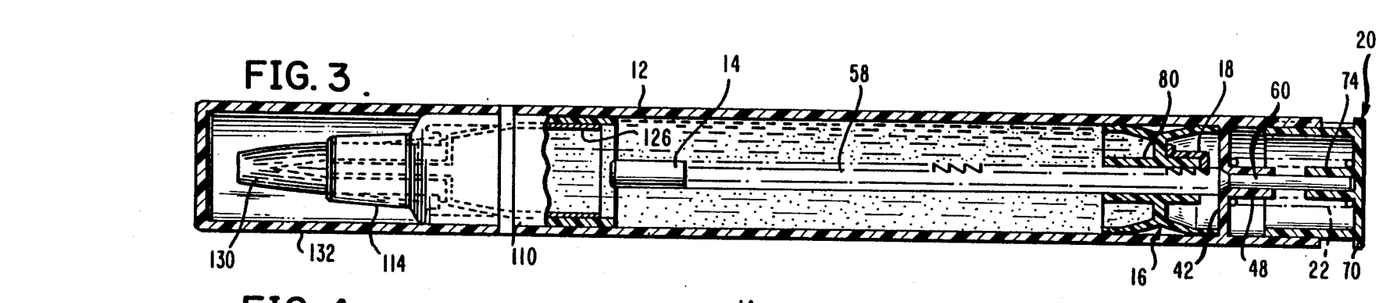
FIGS. 3, 4 and 5 show several positions of the plunger in the dispenser of FIGS. 1 and 2.
Figure 4:
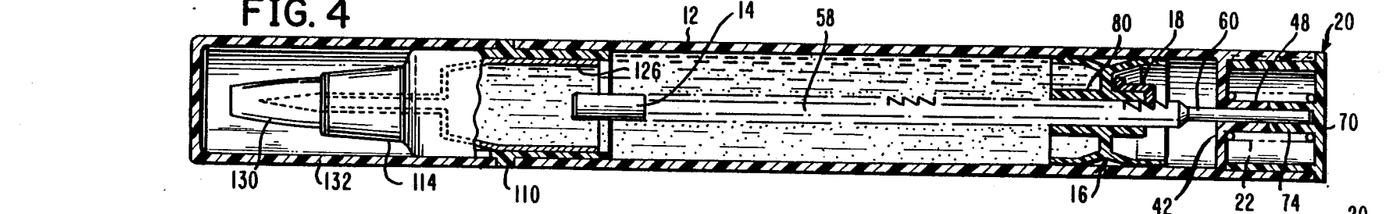
Figure 5:
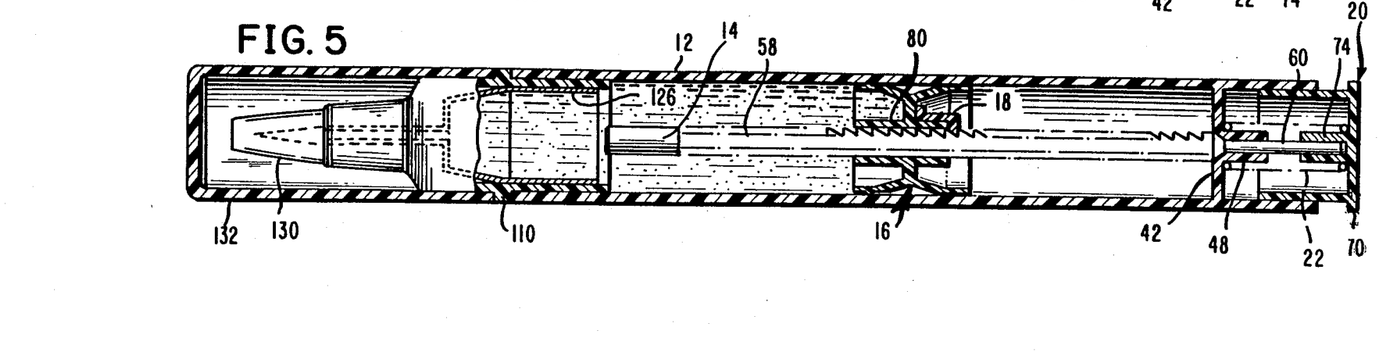

Thus, each depression of the push button 20 causes the plunger 16 to move a set distance toward the discharge opening until eventually all the viscous material 28 is expelled from the tube 12 and the tube 12 is discarded. Several positions of the plunger 16 are respectively illustrated in FIGS. 3, 4 and 5. Thus, FIG. 3 illustrates the initial position of the plunger 16 wherein it is located adjacent bottom wall 42. FIG. 4 illustrates the depressed condition of push button 20 and the position where catch 18 is in the second ridge of rod 14. Following several depressions of push button 20, plunger 16 advances along toward opening 26 as shown in FIG. 5.

The novel plunger 16 of the present invention can be reduced to practice in any of several different forms. FIG. 6a shows the plunger 16 in an embodiment wherein the flap portion 98 is formed of a material which is sufficiently resilient such that the bevelled surface 100 is deformable to allow the catch 18 to slide over the ridges 30 during the backward stroke of rod 14.

Figure 6B:
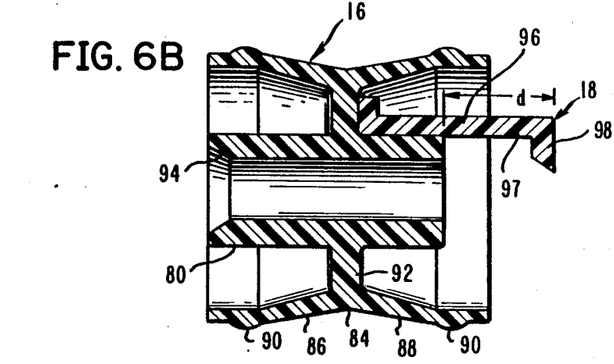
FIG. 6b is a cross-section through a second embodiment of the plunger wherein the catch of the plunger extends a distance behind the plunger.

In FIG. 6b the longitudinally extending section 96 of catch 18 is somewhat longer whereby flap portion 98 trails a distance "d" behind inner tube 80. In this embodiment the material of which catch 18 is formed need not be as resilient or yielding since deflection of the catch 18 can take place in the trailing section 97 of the longitudinally extending section 96.

Figure 6C:
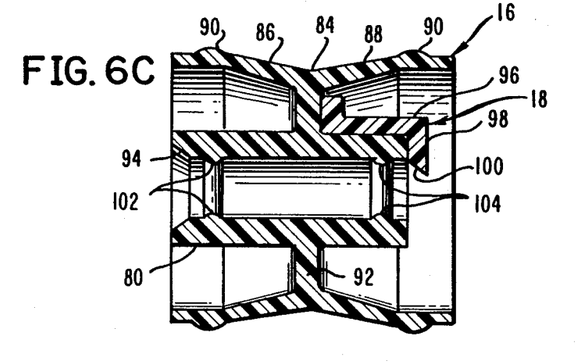
FIG. 6c illustrates the plunger of FIG. 6a, modified to include projections which project against the rod to provide a variant seal construction.

In another variation of the plunger 16, as illustrated in FIG. 6c, inner tube 80, like outer tube 82, is formed with front and rear annular projection 102 and 104 which could be spaced from one another such that these projections register with ridges 30 of rod 14. This embodiment is capable of providing better sealing ability and under certain circumstances an ability to dispense with the catch 18 by appropriate shaping of projection 104 to provide the required ratcheting action in the projection 104.

Figure 6D:
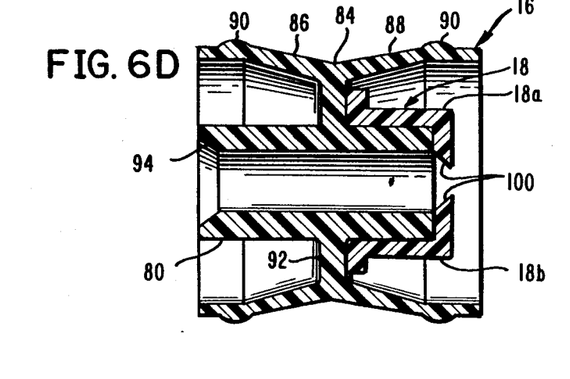

In the embodiment of FIG. 6d the catch 18 is formed of two diametrically opposing sections 18a and 18b, each of which extends over several arc angle degrees about the surface of rod 14.

Figure 7:
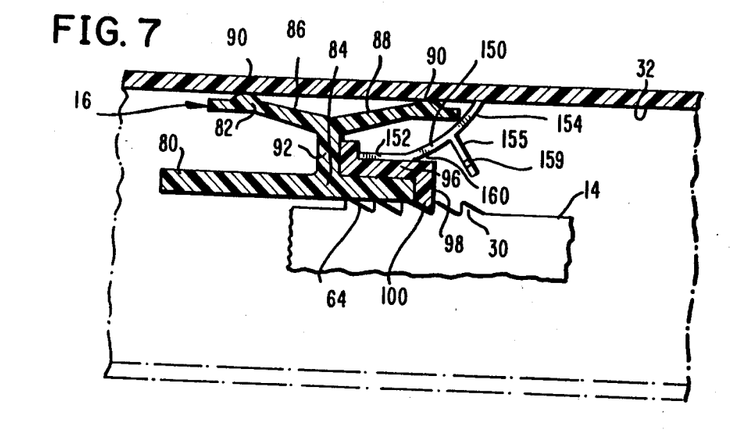
FIG. 7 illustrates a plunger similar to that of FIG. 6a, modified to include a gripper for preventing backward movement of the plunger.
Figure 7A:
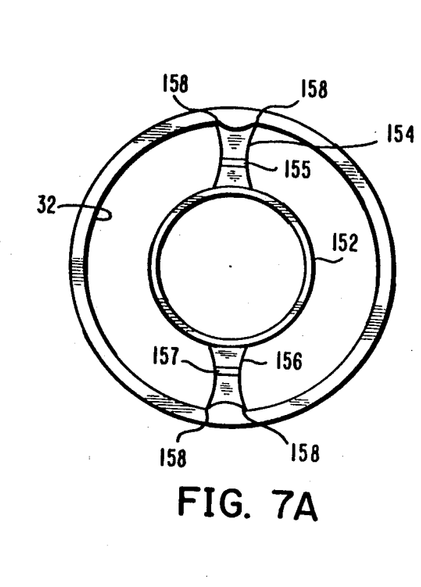
FIG. 7a is an end view of the gripper of FIG. 7.

The plunger 16 of FIG. 7 is further modified to include a gripper 150. It was found that certain waxy products, dispensed from the dispenser of the present invention, may lubricate outer tube 82 and thus interfere with the traction between outer tube 82 and interior surface 32. The gripper 150 is designed to rectify that problem. It includes a ring 152 which is fitted around the longitudinally extending section 96 of plunger 16 and a pair of obliquely extending gripping arms 154 and 156 (FIG. 7a) which extend to interior surface 32. The gripping arms 154 and 156 are preferably formed of a spring steel and terminate in respective nibs 158 which tend to dig into interior surface 32. This will prevent the plunger 16 from being dragged back toward push button 20 when the rod 14 is returning to its rest position. Note that the gripper 150 clears the space 160 directly above the flap portion 98 to allow flap portion 98 to flex radially when it slides over the ridges 30 of rod 14.

Since the dispenser 10 is assembled by inserting the plunger 16 into tube 12 through its discharge opening 26, it is necessary to hold gripping arms 154 and 156 away from interior surface 32 during the assembly process. Otherwise, the arms 154 and 156 would bite into interior surface 32 and prevent plunger 16 from being inserted deep into tube 12.

To this end, each arm 154 and 156 is provided with a respective leg 155 and 157 and each leg 155 and 157 contains a pilot pin hole 159 (FIG. 7). During assembly of dispenser 10, before rod 14 is inserted, arms 154 and 156 are flexed toward each other to the extent that the respective pilot pin hole 159 of legs 155 and 157 overlap one another. While in that position, an insertion tool having a pilot pin (not shown) is inserted into pilot pin hole 159 through the central opening in inner tube 80. The tool holds the arms 154 and 156 flexed away from interior surface 32. With the tool, plunger 16 is inserted deep into tube 12, near and toward push button 20. While being held in place near push button 20 the insertion tool is pulled back and its pilot pin is thereby withdrawn from pilot pin hole 159. Arms 154 and 156 immediately spring back to their normal position depicted in FIG. 7. The arms 154/156 engage interior surface 32 and plunger 16 is no longer movable in a direction toward push button 20.

Figure 7B:
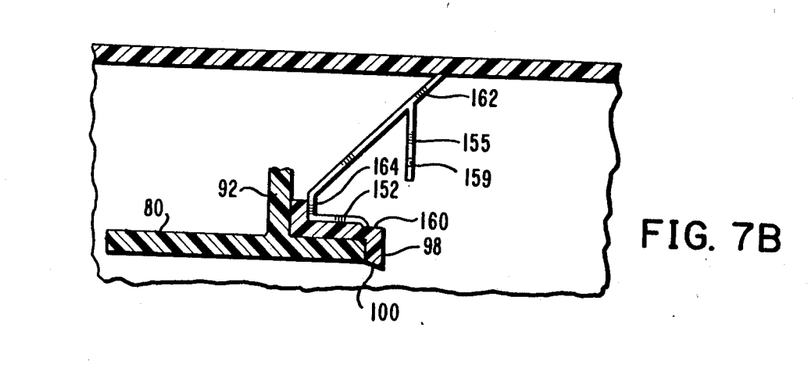
FIG. 7b illustrates a second embodiment of the modified gripper of FIG. 7.

FIG. 7b depicts an alternate embodiment of the gripper in which gripping arms 162 originate more forwardly at 164 relative to ring 152. Gripping arms 162, in FIG. 7b, are similarly provided with legs 155 and pilot pin hole 159, as in the embodiment of FIG. 7.

With either embodiment, any attempted backward movement of plunger 16 will cause nibs 158 to bite into the interior surface 32 and prevent such movement. The plunger 16 will not be able to oscillate in place on account of any waxy material penetrating between outer tube 82 and interior surface 32.

Referring to FIGS. 1 and 2, the discharge mechanism 24 of dispenser 10 includes a tubular nozzle frame 110 having a first skirt portion 112 which fits into tube 12 and which may be fixed in place by any adhering means and an outwardly projecting peripheral region 114 which defines, first and second notches 116 and 118 for supporting a cover 120, and for defining a spout 122. Frame 110 supports a nozzle 124 formed of an enlarged diameter section 126 and a nozzle tube 128. A brush 130 is disposed between spout 122 and nozzle tube 128. The brush 130 receives a dosage of the viscous material 28 from the tube 12 and is usable for applying the material to a surface such as a nail, in case the dispenser is adapted for nail polish applications.

During periods of non-use the discharge mechanism 24 of dispenser 10 may be covered by a cover 120 which can take the form of a cap 132 having first and second annularly extending projections 134, 136 which are shaped to snap into indented notches 116, 118 of frame 110.

Although the invention has been described above in relation to a nail polish pen the clear intention is to encompass any flowable product including cosmetics such as lipstick, foundation make-up, wrinkle concealer make-up, make-up, and the like. The discharge mechanism 24 will always be adapted to the type of product that is to be dispensed.

The dispenser of the present invention is easily assembled through simple insertion of plunger 16 into tube 12 via the open end of tube 12, toward bottom wall 42. Rod 14 is thereafter inserted from the open end of the tube 12 and the tube 12 is filled with material 28 and closed off by the discharge mechanism 24.

Figure 8:
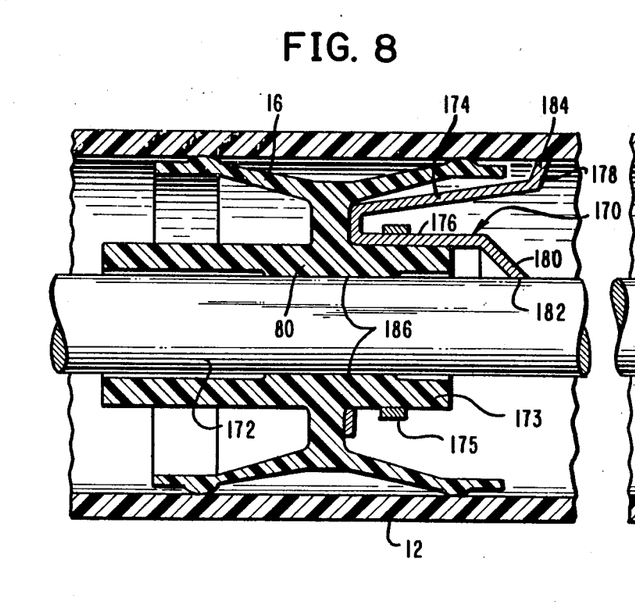
FIG. 8 is a cross-section through a dispenser embodiment having a smooth faced rod and a modified gripper which replaces the catch and the single armed gripper of FIG. 7.

FIG. 8 illustrates a further dispenser embodiment which retains the plunger 16 of the previous embodiment but is otherwise modified to provide a smooth faced, ridgeless, rod 172 and a distinct V-shaped, two-armed, metal gripper 170 including first and second arms 174 and 176. The gripper 170 replaces the catch 18 and the gripper 150 of the previous embodiment.

Arm 176 of gripper 170 lies on inner tube section 80 of plunger 16 and has an obliquely extending finger 180 which bends toward rod 172 and terminates in a biting edge 182 which is positioned to bite into the surface of rod 172 as the rod 172 is pushed forwardly (to the left in FIG. 8).

The second arm 174 of gripper 170 terminates in an obliquely extending finger 178 having an edge 184 for biting into the interior surface 32 of cylindrical tube 12 on any attempt to urge plunger 16 to the right in FIG. 8.

Several identical grippers 170 may be provided around the plunger 16 for equalizing the forces acting on the rod 172 and the cylinder 12. The grippers 170 may be secured to the trailing portion 173 of plunger 16 by a ring 175 or the like. The surface portion 186 of plunger 16 contacting rod 172 is smaller than the corresponding surface in the embodiment of FIG. 8 since less surface is required to seal the smooth faced rod 172. The smaller contact area also avoids creating excessive friction between plunger 16 and rod 172.

Figure 9:
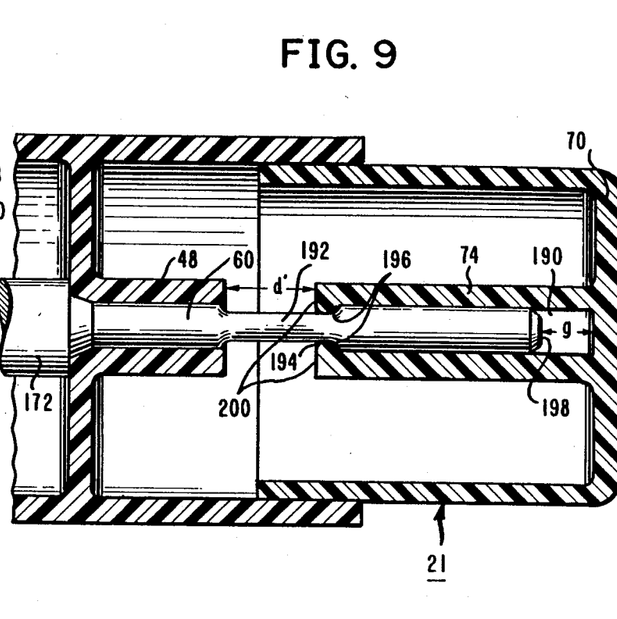
FIG. 9 is a cross-section through a "lost motion" push button embodiment for a dispenser of the present invention.

FIG. 9 illustrates a "lost motion" push button 21 which is especially adapted for effecting minute reciprocations of rod 172 (or rod 14 of FIG. 1), on each actuation of push button 21. In the present embodiment, rod extension 60 of rod 172 extends into a lost-motion cavity 190 of push button 21, reaching short of push button top 70 and leaving a gap "g" from the free end 198 of rod extension 60 to the top 70 of push button 21. Rod extension 60 is modified, in the present embodiment, to include a reduced diameter section 192 along its body between neck 48 of cylinder 12 and push button neck 74 of push button top 70. The free end of push button neck 74 terminates in tabs 194 which project into the reduced diameter section 192 and are normally in contact with the edges 196 of the reduced diameter section 192. In contrast to the embodiment of FIGS. 1–7, rod extension 60 is slidable within cavity 190 of push button 21.

In operation, inward actuation of push button 21 results in initial relative sliding between push button neck 74 and rod extension 60. During this period, push button top 70 moves toward edge 198 of rod extension 60. After traversing the distance "g", push button 21 will begin pushing the rod 172 inwardly into cylinder 12, until the forward edges 200 of tabs 194 contact neck 48. If the size of the spacing "g" is relatively large and only very slightly smaller than the axial size of the reduced diameter section 192 the amount by which rod 172 is moved on each actuation of push button 21 is very small. Consequently, a very minute quantity of material will be dispensed, despite the relatively large distance "d'" traversed by push button 21.

Releasing push button 21 returns push button top 70 to its original position, during the retraction stroke of push button 21 and rod 172. The tabs 194 engage the edges 196 of rod extension 60 during a portion of the retraction stroke, returning rod 172 to its original position as in FIG. 9. The size of the gap "g" relative to the size "d'" of reduced diameter section 192 is selected to obtain a desired dosage amount. However, to be operative, the gap "g" of dispenser 10 must be somewhat shorter than the distance "d'" from edge 200 to neck 48.

For dispensing cosmetic material from a dispenser sized to fit conveniently in the hand, it has been found that plunger 16 should move toward the discharge end of the dispenser by a distance of about 0.01" to 0.08" (0.025 to 0.203 cm) more preferably about 0.015" (0.038 cm). Yet if the total travel of button 21 were so low, the user would incorrectly believe that button 21 was not working To enhance the perception of movement, button 21 should travel at least about 0.09" (0.229 cm). Therefore for a distance d' of 0.09 (0.229 cm), which is also the total travel of button 21, gap g should be 0.075" (0.190 cm) to provide 0 015" (0.038 cm) of movement per stroke in plunger 16. For a distance d' of 0.09" (0.229 cm), the distance g should be from 0.01" to 0.080" (0.025 to 0.203 cm) to provide a stroke of 0.08" to 0.01" (0.203 to 0.025 cm) of plunger 16 each time button 21 is pushed. Of course, these g dimensions would be modified for different valves of d'.

Figure 10:
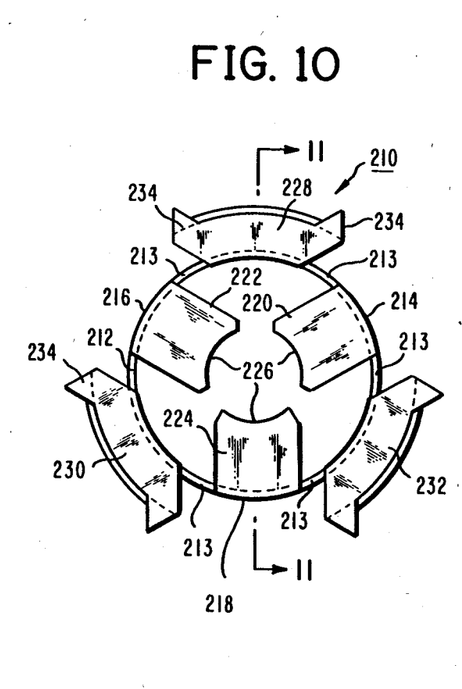
FIG. 10 is a transverse cross-section through a dual function gripper for the plunger of the present invention.
Figure 11:
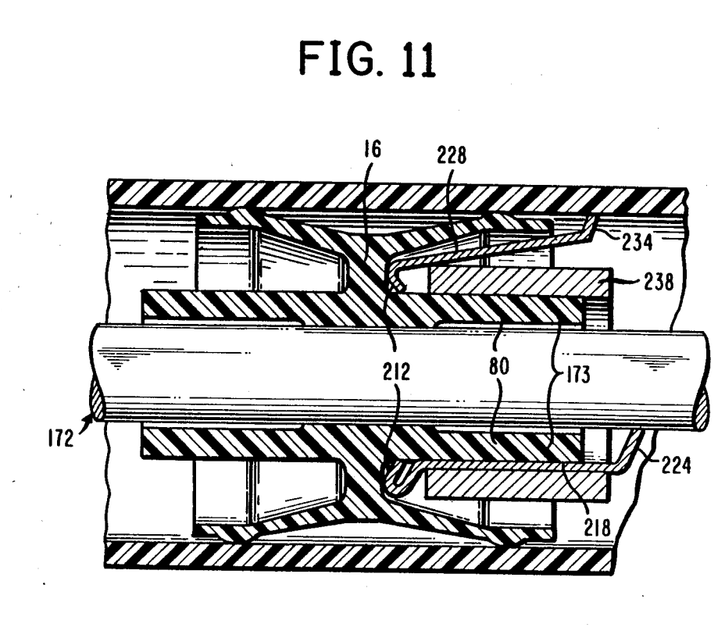
FIG. 11 is a cross-section through line 11—11 in FIG. 10.

Referring to FIGS. 10–11, a variant metal gripper 210 has a ring 212 which fits snugly around the trailing portion 173 of inner tube section 80 of plunger 16 and arms or strips (described below) which extend "generally" parallel to rod 172. Preferably, gripper 210 is formed from a cylindrical tubular section which is cut by several longitudinal slits 213 to provide several wall strips for forming gripper arms. More specifically, gripper 210 has three arms including arms 214, 216 and 218 which lie directly against trailing portion 173 of plunger 16. The free end of each arm 214, 216, 218 is ben inward to form a respective finger 220, 222 and 224 which extends obliquely toward rod 172 with each finger terminating in a curved biting edge 226 having a radius of curvature identical or very closely matched to that of rod 172.

Gripper 210 further includes secondary obliquely extending arms including arms 228, 230 and 232 which are slightly inclined up and away from inner tube section 80 of plunger 16 toward the interior surface 32 of cylindrical tube 12. Each secondary arm 228, 230 and 232 terminates in a respective pair of radially and outwardly directed sharp edged tabs 234. Tabs 234 are oriented to bite into the inner surface wall of dispenser 10 to prevent plunger 16 from being dragged back with rod 172 during the retraction stroke. A cylindrical ring 238 (FIG. 11) fits around the inner first arms 214, 216 and 218 and secures them tightly against trailing portion 173 of plunger 16.

The gripper 210 of FIGS. 10 and 11 operates essentially identically to the previously described gripper 170. Consequently, on the forward stroke of rod 172 the curved biting edges 226 of gripper 210 bite into the surface of rod 172, carrying the plunger 16 forwardly with rod 172. However, during the retraction stroke, plunger 16 slides relative to rod 172 as it is prevented from moving back as a result of the biting of tabs 234 into the interior surface 32 of the rigid cylindrical tube 12 of dispenser 10.

Although the present invention has been described in relation to specific embodiments thereof many other variations and modifications will now become apparent to those skilled in the art. It is therefore preferred that the present invention be limited not by the specific disclosure herein but only by the appended claims.

What is claimed is:

1. A dispenser for dispensing metered portions of a viscous material, said dispenser comprising:
    a cylindrical tube having an actuating axial end and a discharge end through which the viscous material may be expelled from said tube and an interior surface facing into said tube;
    a rod disposed in said cylindrical tube and having a plurality of transversely extending ridges spaced along a longitudinal direction of said rod;
    push button means operatively coupled to said rod for reciprocating said rod axially within said tube from a first position to a second position closer to said discharge end than said first position;
    biasing means for urging said push button means and rod toward said first position;
    a plunger extending around said rod and movable therealong from said actuating end of said tube toward said discharge end, said plunger extending radially from said rod to said interior surface of said tube and being effective to provide a first seal between said interior surface and said plunger and a second seal between said rod and said plunger, said plunger having a general H-shaped cross-section, for cross-sections taken along radial-longitudinal planes in said tube through said plunger, said plunger comprising an outer tubular section which sealingly contacts and is movable along said interior surface of the tube, forming said first seal, an inner tubular section which sealingly surrounds said rod and forms said second seal and a ring-shaped rib extending radially in said tube and connecting said outer and inner tubular sections to one another; and
    catch means connected to said plunger and engageable with said ridges on said rod for moving said plunger, in ratchet-like manner, on said ridges of said rod in a direction toward said discharge end.

2. A dispenser according to claim 1, wherein said outer and inner tubular sections have respective longitudinal centers and wherein said rib is connected to said outer and inner tubular sections at the longitudinal centers thereof.

3. A dispenser according to claim 2 wherein and said plunger and said catch means are comprised of a single integral piece.

4. A dispenser according to claim 2, wherein said dispenser contains a nail polish.

5. A dispenser according to claim 2, wherein said dispenser contains a lipstick.

6. A dispenser according to claim 2, wherein said dispenser contains make-up.

7. A dispenser according to claim 2, further comprising gripper means, secured to said plunger and engageable with said interior surface, for preventing said plunger from moving in a direction toward said actuating axial end.

8. A dispenser according to claim 7, wherein said gripper means comprising an annular ring which extends around said inner tubular section and resilient arms which extend from said annular ring toward said interior surface.

9. A dispenser according to claim 8, further comprising plunger inserting means for holding said resilient arms in a position away from said interior surface to enable said plunger to be inserted into said cylindrical tube.

10. A dispenser according to claim 9, in which said plunger inserting means includes a respective leg connected to each said resilient arms and a pilot pin hole formed in each respective leg, said respective leg and pilot pin hole being effective for temporarily holding said resilient arms away from said interior surface.

11. A dispenser according to claim 1, wherein said outer tubular section has a center region which is spaced away from said interior surface of said tube and first and second cylindrical walls which extend obliquely from the center region to said interior surface.

12. A dispenser according to claim 11, wherein said first and second cylindrical walls are resiliently biased against said interior surface.

13. A dispenser according to claim 12, wherein said rib is connected to said outer tubular section in a manner which is effective for enabling the resiliently biased first and second cylindrical walls to press said inner tubular section against said rod.

14. A dispenser according to claim 13, wherein each one of said first and second walls comprises a respective annularly extending projection, said projections constituting said first seal.

15. A dispenser according to claim 1 further comprising a brush disposed adjacent said discharge end for receiving the viscous material and for facilitating application of the material to a receiving surface.

16. A nail polish pen for dispensing metered portions of a nail polish, said nail polish pen comprising:
    a cylindrical tube having an actuating axial end and a discharge end through which the nail polish may be expelled from said tube and an interior surface facing into said tube;

a rod disposed in said cylindrical tube and having a plurality of transversely extending ridges spaced along a longitudinal direction of said rod;

push button means operatively coupled to said rod for reciprocating said rod axially within said tube from a first position to a second position closer to said discharge end that said first position;

biasing means for urging said push button means and rod toward said first position;

a plunger extending around said rod and movable therealong from said actuating end of said tube toward said discharge end, said plunger extending radially from said rod to said interior surface of said tube and being effective to provide a first seal between said interior surface and said plunger and a second seal between said rod and said plunger, said plunger having a general H-shaped cross-section, for cross-sections taken along radial-longitudinal planes in said tube through said plunger, said plunger comprising an outer tubular section which sealingly contacts and is movable along said interior surface of the tube, forming said first seal, an inner tubular section which sealingly surrounds said rod and forms said second seal and a ring-shaped rib extending radially in said tube and connecting said outer and inner tubular sections to one another; and catch means connected to said plunger and engageable with said ridges on said rod for moving said plunger, in ratchet-like manner, on said ridges of said rod in a direction toward said discharge end.

17. A dispenser for dispensing metered portions of a viscous material, said dispenser comprising:

a cylindrical tube having an actuating axial end and a discharge end through which the viscous material may be expelled from said tube and an interior surface facing into said tube;

a smooth faced rod disposed in said cylindrical tube;

push button means operatively coupled to said rod for reciprocating said rod axially within said tube from a first position to a second position closer to said discharge end than said first position;

biasing means for urging said push button means and rod toward said first position;

a plunger extending around said rod and movable therealong from said actuating end of said tube toward said discharge end, said plunger extending radially from said rod to said interior surface of said tube and being effective to provide a first seal between said interior surface and said plunger and a second seal between said rod and said plunger, said plunger having a general H-shape cross-section, for cross-sections taken along radial-longitudinal planes in said tube through said plunger and said plunger comprising an outer tubular section which sealingly contacts and is movable along said interior surface of the tube, an inner tubular section which sealingly surrounds said rod and a ring-shaped rib extending radially in said tube and connecting said outer and inner tubular sections to one another;

a gripper secured to said plunger and having a first gripper arm for engaging and biting into said rod when said rod is moved toward said discharge end to thereby carry said plunger forwardly with said rod and a second gripper arm for biting into said cylindrical tube when said rod is being retracted to its second position to prevent said plunger and gripper from moving with said rod toward said actuating end.

18. A dispenser according to claim 17, in which said first arm of said gripper includes a first main section which lies generally flat against said second seal and a first finger extension which extends toward and engages said rod.

19. A dispenser according to claim 18, wherein the second arm includes a second main section and a second finger extension.

20. A dispenser according to claim 19, in which said gripper is formed of a single integral piece.

21. A dispenser according to claim 17, wherein said push button means is effective for controlling the size of the reciprocation path of said rod on each actuation of said push button means.

22. A dispenser according to any one of claim 21, wherein said push button means includes delay means for delaying forward movement of said rod with respect to forward actuation of said push button means.

23. A dispenser according to claim 22, including a push button well, said push button means being reciprocatingly movable in said push button well, said rod including a rod extension in said well, said push button means having a top and said top being spaced from said rod extension whereby said push button means traverses a predetermined distance into said well before movingly engaging said rod extension.

24. A dispenser according to claim 23, said rod extension having a reduced diameter section, said push button means having a push button neck depending from said top and terminating in tabs projecting into said reduced diameter section of said rod extension.

25. A dispenser for dispensing metered portions of a viscous material, said dispenser comprising:

a cylindrical tube having an actuating axial end and a discharge end through which the viscous material may be expelled from said tube and an interior surface facing into said tube;

a smooth-faced rod disposed in said cylindrical tube;

push button means operatively coupled to said rod for reciprocating said rod axially within said tube from a first position to a second position closer to said discharge end than said first position, said push button means including delay means for delaying forward movement of said rod with respect to forward actuation of said push button means;

biasing means for urging said push button means and rod toward said first position;

a plunger extending around said rod and moveable therealong from said actuating end of said tube toward said discharge end, said plunger extending radially from said rod to said interior surface of said tube and being effective to provide first seal between said interior surface and said plunger and a second seal between said rod and said plunger; and gripper means for engaging said plunger with said rod when said rod is moved toward said discharge end in a manner that is effective to carry said plunger toward said discharge end.

26. A dispenser according to claim 25, including a push button well, said push button means being reciprocatingly movable in said push button well, said rod including a rod extension in said well, said push button means having a top and said top being spaced from said rod extension whereby said push button means traverses a predetermined distance into said well before movingly engaging said rod extension.

27. A dispenser according to claim 25, wherein said gripper means includes a first gripper arm for engaging and biting into said rod when said rod is moved toward said discharge end to thereby carry said plunger forwardly and a second gripper arm for biting into said interior surface of said cylindrical tube when said rod is being retracted to a resting position to prevent said plunger and gripper from moving toward said actuating.

28. A dispenser according to claim 27, in which said first arm of said gripper means includes a first main section which lies generally flat against said second seal and a first finger extension which extends toward and engages said rod, and wherein said second arm of said gripper means includes a second main section and a second finger extension.

29. A dispenser according to claim 28, wherein said plunger has a general H-shaped cross-section, for cross-sections taken along radial-longitudinal planes in said tube through said plunger.

30. A dispenser according to claim 29, wherein said plunger comprises an outer tubular section which sealingly contacts and is movable along said interior surface of said tube, an inner tubular section which sealingly surrounds said rod and a ring-shaped rib extending radially in said tube and connecting said outer and inner tubular sections to one another.

31. A dispenser according to claim 28, wherein said gripper means is formed by a tubular cylindrical section which is slit by a plurality of axially extending slit lines spaced circumferentially around a peripheral wall of said gripper.

32. A dispenser according to claim 31, wherein said slits divide the peripheral wall of said gripper into a plurality of strips, alternate strips of said plurality of strips extending inwardly to engage said rod and other ones of said strips extending outwardly to engage said interior surface of said cylindrical tube.

33. A dispenser according to claim 32, wherein said gripper is disposed about a trailing portion of said plunger and further including a ring disposed about said first arms of said gripper and around said plunger for securing said gripper to said plunger.

34. A dispenser for dispensing metered portions of a viscous material, said dispenser comprising:
a cylindrical tube having an actuating axial end and a discharge end through which the viscous material may be expelled from said tube and an interior surface facing into said tube;
a smooth faced rod disposed in said cylindrical tube;
push button means operatively coupled to said rod for reciprocating said rod axially within said tube from a first position to a second position closer to said discharge end than said first position;
biasing means for urging said push button means and rod toward said first position;
a plunger extending around said rod and movable therealong from said actuating end of said tube toward said discharge end, said plunger extending radially from said rod to said interior surface of said tube and being effective to provide a first seal between said interior surface and said plunger and a second seal between said rod and said plunger;
a gripper secured to said plunger and having a first gripper arm for engaging and biting into said rod when said rod is moved toward said discharge end to thereby carry said plunger forwardly with said rod and a second gripper arm for biting into said cylindrical tube when said rod is being retracted to its second position to prevent said plunger and gripper from moving with said rod toward said actuating end, said first arm of said gripper including a first main section which lies generally flat against said second seal and a first finger extension which extends toward and engages said rod, said second arm including a second main section and a second finger extension, said gripper being formed of a single integral piece, and further comprising a ring disposed about said plunger and said gripper for securing said gripper to said plunger.

35. A dispenser according to claim 34, in which said gripper is constructed of metal.

36. A dispenser for dispensing metered portions of a viscous material, said dispenser comprising:
a cylindrical tube having an actuating axial end and a discharge end through which the viscous material may be expelled from said tue and an interior surface facing into said tube;
a smooth faced rod disposed in said cylindrical tube;
push button means operatively coupled to said rod for reciprocating said rod axially within said tube from a first position to a second position closer to said discharge end than said first position;
biasing means for urging said push button means and rod toward said first position;
a plunger extending around said rod and movable therealong from said actuating end of said tube toward said discharge end, said plunger extending radially from said rod to said interior surface of said tube and being effective to provide a first seal between said interior surface and said plunger and a second seal between said rod and said plunger;
a gripper secured to said plunger and having a first gripper arm for engaging and biting into said rod when said rod is moved toward said discharge end to thereby carry said plunger forwardly with said rod and a second gripper arm for biting into said cylindrical tube when said rod is being retracted to its second position to prevent said plunger and gripper from moving with said rod toward said actuating end, said push button means being effective for controlling the size of the reciprocation path of said rod on each actuation of said push button means and said push button means including delaying means for delaying forward movement of said rod with respect to forward actuation of said push button means.

37. A dispenser according to claim 36, including a push button well, said push button means being reciprocatingly movable in said push button well, said rod including a rod extension in said well, said push button means having a top and said top being spaced from said rod extension whereby said push button means traverses a predetermined distance into said well before movingly engaging said rod extension.

38. A dispenser according to claim 37, said rod extension having a reduced diameter section, said push button means having a push button neck depending from said top and terminating in tabs projecting into said reduced diameter section of said rod extension.

* * * * *